(No Model.)

M. J. LYNN.
FILTER.

No. 598,468. Patented Feb. 1, 1898.

Witnesses:
Edw. P. Duvall Jr.
John S. Stump

Inventor:
Michael J. Lynn
By Percy B. Hills,
Attorney

THE NORRIS PETERS CO., PHOTO-LITHO., WASHINGTON, D. C.

UNITED STATES PATENT OFFICE.

MICHAEL J. LYNN, OF ASHLAND, KENTUCKY, ASSIGNOR, BY DIRECT AND MESNE ASSIGNMENTS, TO THOMAS HOWARD, OF SAME PLACE, AND W. S. HARRISON.

FILTER.

SPECIFICATION forming part of Letters Patent No. 598,468, dated February 1, 1898.

Application filed April 8, 1897. Serial No. 631,204. (No model.)

*To all whom it may concern:*

Be it known that I, MICHAEL J. LYNN, a citizen of the United States, residing at Ashland, in the county of Boyd and State of Kentucky, have invented certain new and useful Improvements in Filters, of which the following is a specification.

My invention relates to filters, and has for its object to provide certain improvements in the construction and arrangement of the same, whereby a more thorough filtering of the liquid is accomplished, while at the same time provision is made for a rapid and thorough cleansing of the filtering material by a reversal of the current through the filter.

Certain other improvements in the details of construction have been embodied in my improved device, as are hereinafter more specifically described and claimed, reference being had to the accompanying drawings, in which—

Figure 1:
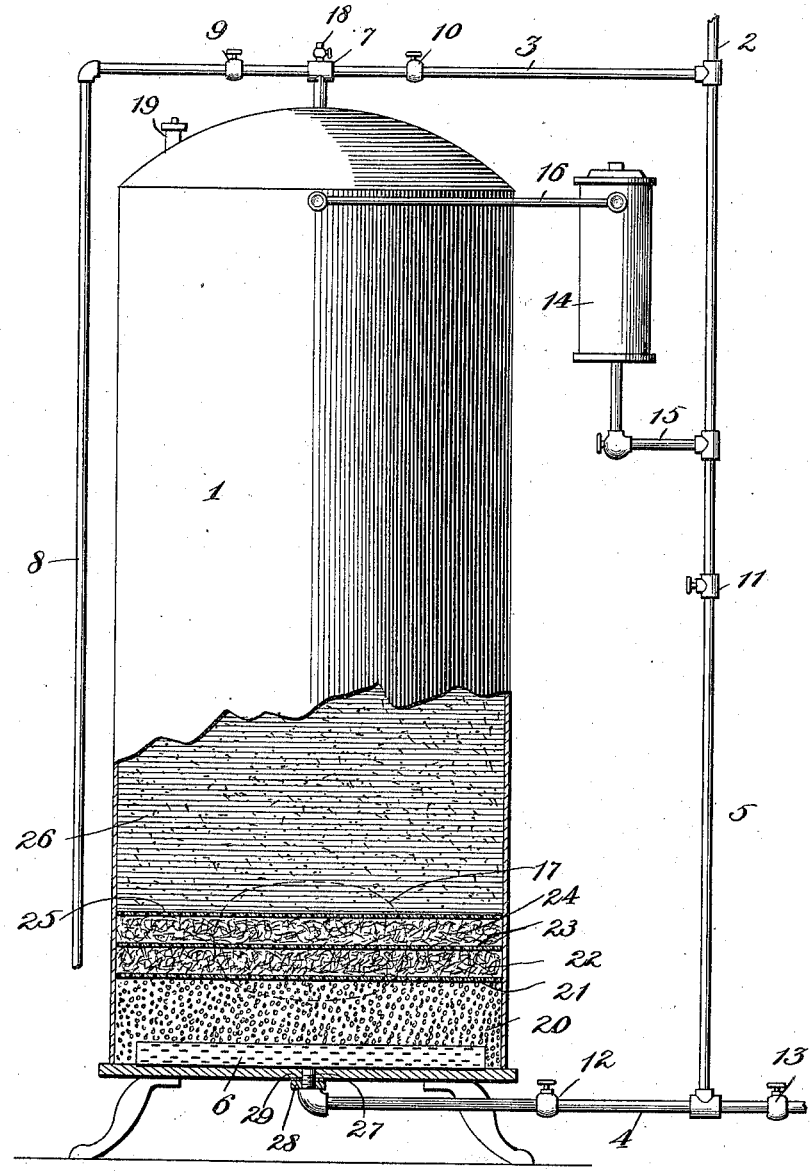
Figure 2:
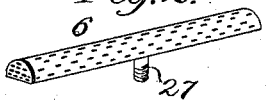

Figure 1 is a side elevation of a filter and its pipe connections embodying my improved construction, the filter-casing being partly broken away to show the character and arrangement of the filtering material therein. Fig. 2 is an enlarged detail end view of the discharge-strainer.

In the said drawings the numeral 1 denotes the filter-casing, the same being hermetically closed at top and bottom. A supply-pipe 2 communicates with the top of the casing through pipe 3 and also with the exit-pipe 4 through pipe 5, as shown, said exit-pipe being tapped centrally into the bottom of the casing and connected to the strainer 6, as hereinafter described. Also connected to the T 7, that leads into the top of the casing, is a waste-pipe 8. Valves 9, 10, 11, 12, and 13 are located in the various pipes, as shown.

The usual alum-pot 14 is located between pipe 5 and the casing, as shown, the proper connections being made by the valved pipes 15 and 16, as will be readily understood.

A hand-hole 17 in the side of the casing provides for access to the interior of said casing for the purpose of removing and renewing the filtering material when necessary. The T 7 in the top of the casing is also provided with an air-vent 18, while a removable plug 19 provides for the insertion of sand into the casing, as hereinafter described.

The filtering material employed is as follows: In the bottom of the casing is placed very fine gravel 20, on top of which is loosely placed a perforated lead plate 21; then a layer of fine asbestos 22 in a loose state; then a second perforated lead plate 23; then a layer of coarser asbestos 24, also in a loose state; then a third perforated lead plate 25, and, finally, the casing is filled nearly to the top with sand 26, the same being screened to such size that it will not pass through the perforations in plate 25.

The strainer 6 in the bottom of the casing is preferably composed of block-tin and is formed, as shown in Fig. 2, with its bottom side flat to snugly fit the bottom of the casing and having its rounded sides and top and its ends perforated for the passage of the liquid. This strainer is placed in position by inserting the same through the hand-hole 17 and passing its central screw-threaded stem 27 through the aperture in the bottom of the casing, where it is engaged with the pipe 4, a threaded nut 28, with an intermediate gasket 29, being first placed thereon and serving to positively retain the flat under side of said strainer in contact with the bottom of the casing, as well as to form a liquid-tight joint, as will be readily understood.

From the above description the operation of my improved construction will be understood to be as follows: The strainer 6 being fastened in position, the gravel, asbestos, and lead plates are successively introduced and arranged in position through the hand-hole 17, it being understood that said plates being formed of lead can be bent so as to pass freely through said hand-hole and then flattened again when inside the casing. These parts being in position, the hand-hole is closed by the usual plate and the sand 26 inserted through the plug-aperture 19, the filter being then ready for use. Now by closing valves 9 and 11 and opening valves 10, 12, and 13 the current will pass from pipe 2 through pipe 3 into the top of the casing and thence through the filtering material out through strainer 6 and pipe 4. It has been found in practice that by the employment of the large body of sand 26 and the two layers of loose asbestos 24 and 22 the impurities will be confined to the sand and the layer of coarse asbestos 24, while the layer of finer asbestos 22 and the gravel 20 will show practically no signs of said impurities.

To cleanse the filtering material, the valves 10 and 13 are closed and valves 9, 11, and 12 are opened, whereby the current will pass from supply-pipe 2 through pipes 5 and 4 into the bottom of the casing and out through waste-pipe 8 in the usual manner. Now by reason of the fact that all the filtering materials are in a loose state and the separating-plates 21, 23, and 25 are loosely placed thereon the force of the upward current will necessarily lift said plates somewhat, thereby permitting a thorough agitation of the filtering material and a consequent rapid and thorough washing out of the same. Moreover, the shape of the strainer 6 affords an opportunity for thoroughly washing the bottom of the casing, so that even should any impurities have penetrated thus far their thorough removal is readily accomplished. The material of which the strainer 6 and plates 21, 23, and 25 are composed also removes any danger of a corrosive action thereon.

Having thus described my invention, what I claim as new, and desire to secure by Letters Patent, is—

1. In a filter, the combination with the filter-casing, of successive layers of filtering material, and perforated separating-plates therebetween, said plates being loosely placed in position to permit a vertical movement thereto when subjected to an upward current of liquid, the top layer of filtering material lying upon the upper separating-plate, a space being left between said top layer and the top of the filter-casing, substantially as set forth.

2. In a filter, the combination with the filter-casing, of successive layers of sand, fine asbestos in a loose state, and coarser asbestos in a loose state, and perforated separating-plates therebetween, said plates being loosely placed in position to permit a vertical movement thereto when subjected to an upward current of liquid, the layer of sand lying upon the upper separating-plate, a space being left between said sand and the top of the filter-casing, substantially as set forth.

In testimony whereof I affix my signature in the presence of two subscribing witnesses.

MICHAEL J. LYNN.

Witnesses:
JOHN M. BURNS,
CHAS. J. LAWRENCE.